(12) United States Patent
Minegishi

(10) Patent No.: US 10,817,400 B2
(45) Date of Patent: Oct. 27, 2020

(54) MANAGEMENT APPARATUS AND MANAGEMENT METHOD

(71) Applicant: FUJITSU LIMITED, Kawasaki-shi, Kanagawa (JP)

(72) Inventor: Akira Minegishi, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 15/920,621

(22) Filed: Mar. 14, 2018

(65) Prior Publication Data

US 2018/0285232 A1 Oct. 4, 2018

(30) Foreign Application Priority Data

Mar. 30, 2017 (JP) .................. 2017-068233

(51) Int. Cl.
*G06F 11/34* (2006.01)
*G06F 11/30* (2006.01)
*G06F 9/455* (2018.01)

(52) U.S. Cl.
CPC ...... *G06F 11/3433* (2013.01); *G06F 9/45533* (2013.01); *G06F 9/45558* (2013.01); *G06F 11/3024* (2013.01); *G06F 11/3055* (2013.01); *G06F 2009/45591* (2013.01)

(58) Field of Classification Search
CPC ............. G06F 11/3433; G06F 11/3055; G06F 9/45558; G06F 9/45533; G06F 11/3024; G06F 2009/45591
See application file for complete search history.

(56) References Cited

U.S. PATENT DOCUMENTS

| 2004/0153834 A1 | 8/2004 | Oshima et al. |
| 2016/0127509 A1* | 5/2016 | Uriel .................. H04L 61/2015 709/203 |
| 2016/0259578 A1* | 9/2016 | Hirai ...................... G06F 3/067 |

FOREIGN PATENT DOCUMENTS

| JP | 2001-101033 | 4/2001 |
| JP | 2006-268277 | 10/2006 |

* cited by examiner

*Primary Examiner* — Sisley N Kim
(74) *Attorney, Agent, or Firm* — Fujitsu Patent Center

(57) ABSTRACT

A management apparatus is configured to acquire status information of a virtual infrastructure on which a first management service operates, perform mutual communication with a second management service that has a function identical to a function of the first management service and that operates on the virtual infrastructure, identify a status for an item used for identifying a problem area based on a communication status, the status information of the virtual infrastructure, and a communication status with the second management service, acquire, from the second management service, a status identified for the item based on status information of the virtual infrastructure and a communication status of the mutual communication, identify, based on the identified status and the acquired status for the item, whether the problem area is either the first management service or the second management service, and perform a restoration operation corresponding to the identified problem area.

4 Claims, 13 Drawing Sheets

FIG. 3A

| ITEM | MONITORING MANAGEMENT SYSTEM A | MONITORING MANAGEMENT SYSTEM B | DETERMINATION |
|---|---|---|---|
| SERVICE DAEMON COMMUNICATION | CONNECTION IMPOSSIBLE × | CONNECTION IMPOSSIBLE × | × |
| MANAGEMENT MANAGER COMMUNICATION | CONNECTION POSSIBLE ○ | CONNECTION POSSIBLE ○ | ○ |
| SERVICE VM COMMUNICATION | RESPONSE ○ | RESPONSE ○ | ○ |
| STATUS INFORMATION | NO LATEST INFORMATION × | NO LATEST INFORMATION × | × |
| NOTIFICATION SERVICE | NOTIFICATION ○ | NOTIFICATION ○ | ○ |
| HARDWARE INFORMATION | NO PROBLEM ○ | NO PROBLEMc ○ | ○ |
|  |  |  |  |
| OVERALL DETERMINATION |  |  | PROBLEM WITH SERVICE DAEMON |

FIG. 3B

| ITEM | MONITORING MANAGEMENT SYSTEM A | MONITORING MANAGEMENT SYSTEM B | DETERMINATION |
|---|---|---|---|
| SERVICE DAEMON COMMUNICATION | CONNECTION POSSIBLE ○ | CONNECTION POSSIBLE ○ | ○ |
| MANAGEMENT MANAGER COMMUNICATION | CONNECTION POSSIBLE ○ | CONNECTION IMPOSSIBLE × | × |
| SERVICE VM COMMUNICATION | RESPONSE ○ | NO RESPONSE × | × |
| STATUS INFORMATION | LATEST INFORMATION ○ | LATEST INFORMATION ○ | ○ |
| NOTIFICATION SERVICE | NOTIFICATION ○ | NOTIFICATION ○ | ○ |
| HARDWARE INFORMATION | NO PROBLEM ○ | NO PROBLEMc ○ | ○ |
|  |  |  |  |
| OVERALL DETERMINATION |  |  | PROBLEM WITH SERVICE DAEMON |

FIG. 3C

| ITEM | MONITORING MANAGEMENT SYSTEM A | MONITORING MANAGEMENT SYSTEM B | DETERMINATION |
|---|---|---|---|
| SERVICE DAEMON COMMUNICATION | CONNECTION POSSIBLE ○ | CONNECTION POSSIBLE ○ | ○ |
| MANAGEMENT MANAGER COMMUNICATION | CONNECTION IMPOSSIBLE × | CONNECTION IMPOSSIBLE × | × |
| SERVICE VM COMMUNICATION | RESPONSE ○ | RESPONSE ○ | ○ |
| STATUS INFORMATION | NO LATEST INFORMATION × | LATEST INFORMATION ○ | × |
| NOTIFICATION SERVICE | NO NOTIFICATION × | NOTIFICATION ○ | × |
| HARDWARE INFORMATION | NO PROBLEM ○ | NO PROBLEMc ○ | ○ |
| | | | |
| OVERALL DETERMINATION | | | PROBLEM WITH SERVICE DAEMON |

FIG. 4

| STATES PATTERN | SERVICE VM(A) | SERVICE VM(B) | SERVICE DAEMON | RESTORATION OPERATION |
|---|---|---|---|---|
| 0 | ○ | ○ | ○ | NO PROBLEM |
| 1 | ○ | ○ | × | RESTART OF SERVICE DAEMON |
| 2 | ○ | × | ○ | RESTART OF SERVICE VM (B) |
| 3 | × | ○ | ○ | RESTART OF SERVICE VM (A) |
| 4 | ○ | × | × | RESTARTS OF SERVICE DAEMON AND SERVICE VM (B) |
| 5 | × | ○ | × | RESTARTS OF SERVICE DAEMON AND SERVICE VM (A) |
| 6 | × | × | ○ | EXTERNAL RESTARTS BASED ON NOTIFICATION |
| 7 | × | × | × | EXTERNAL RESTARTS BASED ON NOTIFICATION |

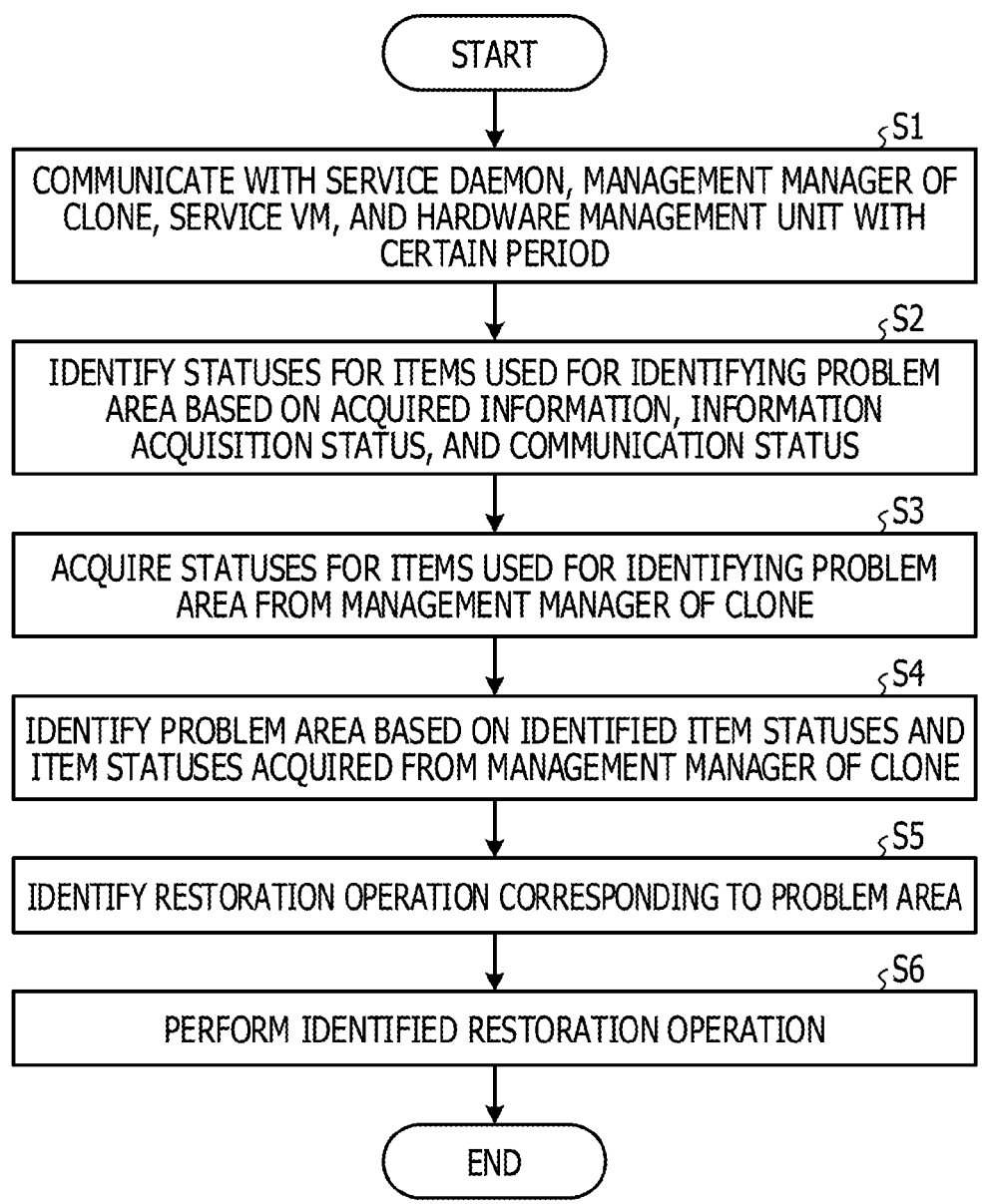

FIG. 7A

| INFORMATION LIST | STATUS (MONITORING MANAGEMENT SYSTEM A) | INFORMATION LIST | STATUS (MONITORING MANAGEMENT SYSTEM B) |
|---|---|---|---|
| MANAGEMENT MANAGER STATUS | OK | MANAGEMENT MANAGER STATUS | OK |
| SERVICE VM STATUS | OK | SERVICE VM STATUS | OK |
| SERVICE DAEMON STATUS | NG | SERVICE DAEMON STATUS | NG |

FIG. 7B

| INFORMATION LIST | STATUS (MONITORING MANAGEMENT SYSTEM A) | INFORMATION LIST | STATUS (MONITORING MANAGEMENT SYSTEM B) |
|---|---|---|---|
| MANAGEMENT MANAGER STATUS | OK | MANAGEMENT MANAGER STATUS | NG |
| SERVICE VM STATUS | OK | SERVICE VM STATUS | OK |
| SERVICE DAEMON STATUS | OK | SERVICE DAEMON STATUS | OK |

FIG. 7C

| INFORMATION LIST | STATUS (MONITORING MANAGEMENT SYSTEM A) | INFORMATION LIST | STATUS (MONITORING MANAGEMENT SYSTEM B) |
|---|---|---|---|
| MANAGEMENT MANAGER STATUS | OK | MANAGEMENT MANAGER STATUS | NG |
| SERVICE VM STATUS | OK | SERVICE VM STATUS | NG |
| SERVICE DAEMON STATUS | OK | SERVICE DAEMON STATUS | OK |

# MANAGEMENT APPARATUS AND MANAGEMENT METHOD

CROSS-REFERENCE TO RELATED APPLICATION

This application is based upon and claims the benefit of priority of the prior Japanese Patent Application No. 2017-68233, filed on Mar. 30, 2017, the entire contents of which are incorporated herein by reference.

FIELD

The embodiment discussed herein is related to a management apparatus and a management method.

BACKGROUND

In recent years, virtual environments have grown in use in which hardware resources, such as a central processing unit (CPU) and a main memory, are virtualized by virtualization technology. In a virtual environment, to monitor and manage statuses of hardware and the virtual environment, a service virtual machine (VM) is established and operated as a dedicated VM for the virtual environment.

FIG. 10 illustrates a management mechanism in a virtual environment. As illustrated in FIG. 10, in the virtual environment, a virtual infrastructure 4 virtualizes hardware 6 and provides virtualized hardware. A service VM 92 operates on the virtual infrastructure 4. In the service VM 92, a management manager 93 operates. The management manager 93 acquires information about statuses of the hardware 6 and the virtual environment from a service daemon 5 that operates on the virtual infrastructure 4 to monitor and manage the virtual environment.

There is a technique in which, in a computer including a first OS, a second OS different from the first OS, a multi-OS control unit having an OS-to-OS communication function for communication between the first OS and the second OS, and a failure monitor that operates on the second OS, the failure monitor monitors the first OS for failure via the OS-to-OS communication function. Here, "OS" refers to "operating system". According to this technique, an OS may be monitored for failure without adding dedicated hardware.

Furthermore, there is a technique in which, after starting a VM, a first AP starts a second AP that operates on the VM, and monitors operation of the second AP, and in which, when detecting an abnormality in the operation of the second AP, the first AP switches the VM to another VM and restarts the second AP on the switched VM to thereby restore the second AP. Here, "AP" refers to "application program". According to this technique, when the second AP is caused to operate in an environment of an OS different from a current OS, monitoring may be performed even when the OS on which the second AP is operating operates abnormally.

Examples of the related art include Japanese Laid-open Patent Publication No. 2001-101033 and Japanese Laid-open Patent Publication No. 2006-268277.

SUMMARY

According to an aspect of the invention, a management apparatus includes a memory and a processor coupled to the memory and configured to acquire status information of a virtual infrastructure on which a first management service operates, the virtual infrastructure executed on the management apparatus, perform mutual communication with a second management service that has a function identical to a function of the first management service and that operates on the virtual infrastructure, identify a status for an item used for identifying a problem area based on a communication status between the virtual infrastructure and the first management service, the status information of the virtual infrastructure, and a communication status with the second management service, acquire, from the second management service, a status identified for the item based on the status information of the virtual infrastructure and a communication status of the mutual communication, identify, based on the identified status and the acquired status for the item, whether the problem area is either the virtual infrastructure, the first management service, or the second management service, and perform a restoration operation corresponding to the identified problem area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3A illustrates how to determine that there is a problem with a service daemon;

FIG. 3B illustrates how to determine that there is a problem with a service virtual machine (VM);

FIG. 3C illustrates how to determine that there is a problem with a management manager;

FIG. 4 illustrates restoration operations;

FIG. 6 is a flowchart illustrating a flow of a process performed by the management manager;

FIGS. 7A to 7C each illustrate how to identify a problem area using statuses of the management manager, the service VM, and the service daemon;

DESCRIPTION OF EMBODIMENT

Figure 10:
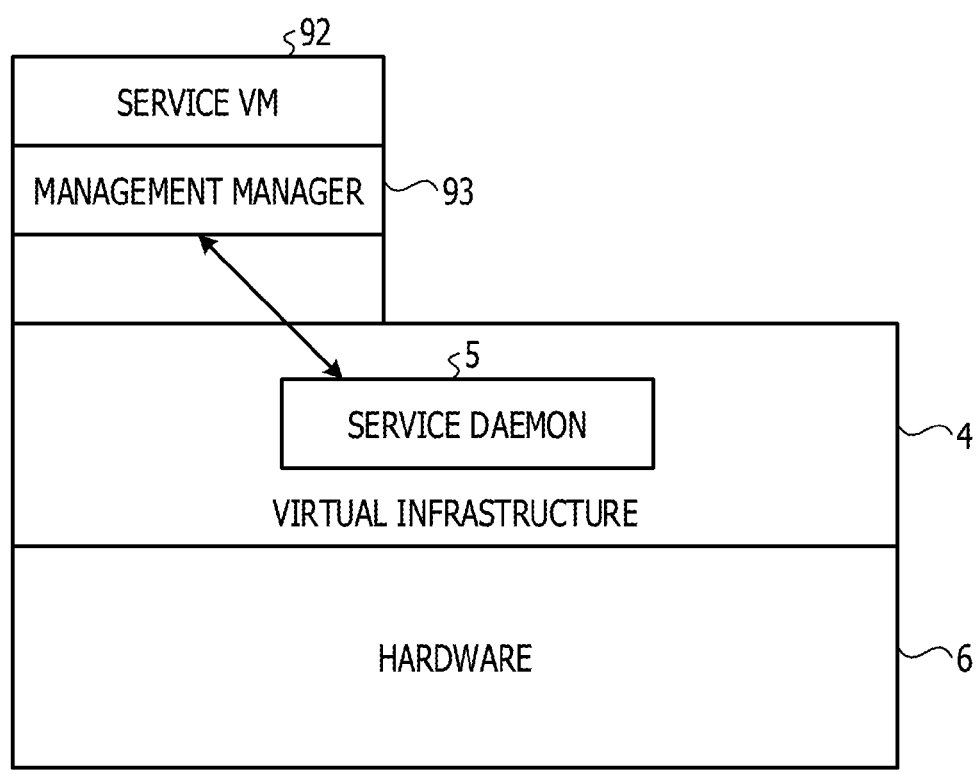
FIG. 10 illustrates a management mechanism in a virtual environment.

In the management mechanism illustrated in FIG. 10, in the case where a situation has arisen, for example, in which the status of the hardware 6 is not able to be displayed, it takes time to identify whether the situation has been caused by the service VM 92 or the service daemon 5, and it thus takes time to restore the management mechanism.

An aspect of the embodiment is directed to restoring a management mechanism in an information processing environment in a short time.

An embodiment of a management apparatus, a management method, and a management program disclosed in the present application will be described in detail below with reference to the drawings. Note that this embodiment is not intended to limit a disclosed technique.

Embodiment

Figure 1:
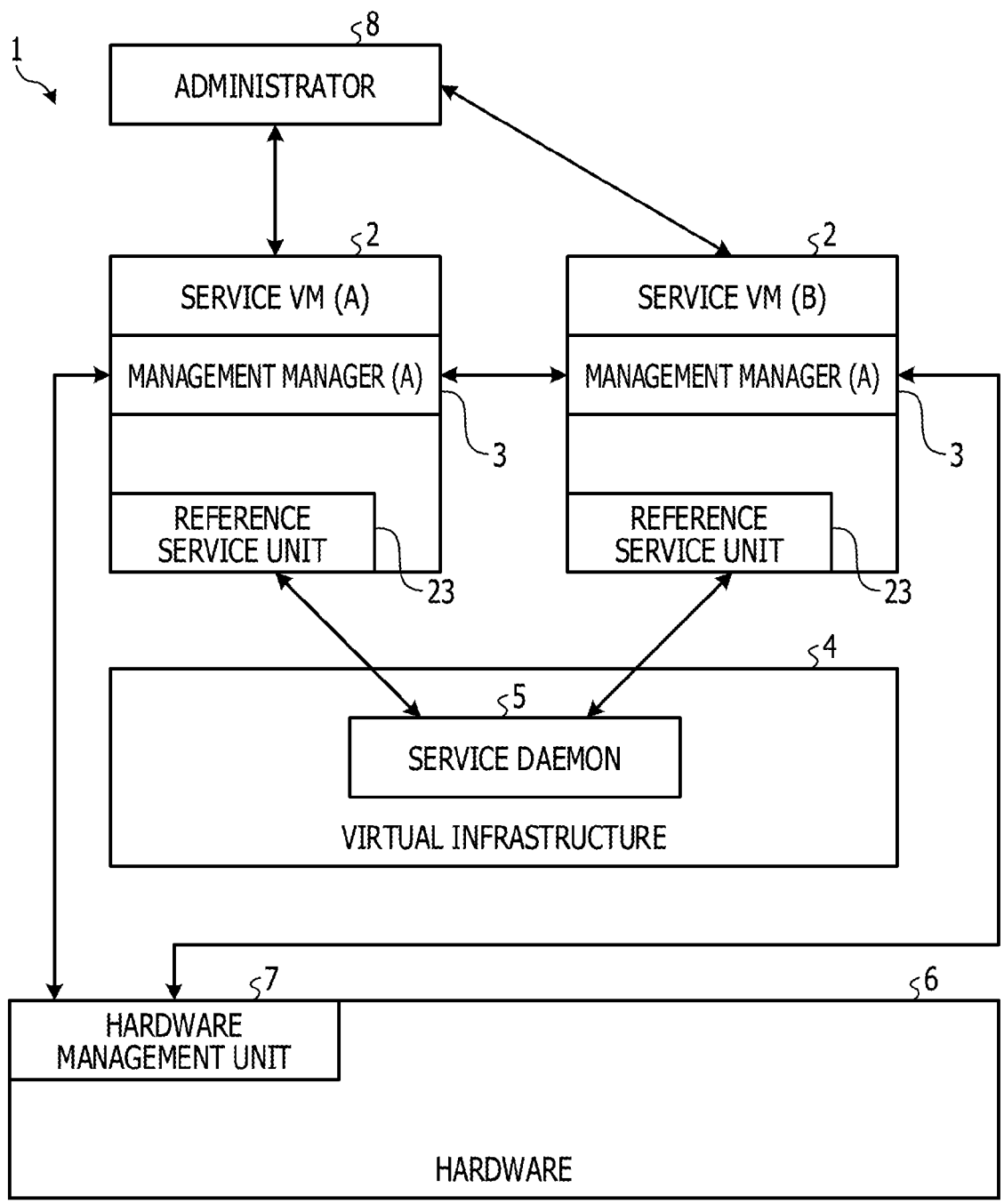
FIG. 1 illustrates the workings of a management mechanism implemented by a management system according to an embodiment.

First, the workings of a management mechanism implemented by a management system according to the embodiment will be described. FIG. 1 illustrates the workings of the management mechanism implemented by the management system according to the embodiment. As illustrated in FIG. 1, in a management system 1 according to the embodiment, two service virtual machines (VMs) 2 represented by a service VM (A) and a service VM (B) operate on a virtual infrastructure 4.

The service VMs 2 are each a dedicated VM for monitoring and managing statuses of hardware 6 and a virtual environment. In the service VM (A), a management manager 3 represented by a management manager (A) operates. The management manager 3 acquires information about statuses of the hardware 6 and the virtual environment from a service daemon 5 that operates on the virtual infrastructure 4 to monitor and manage the virtual environment. The service VM (B) is a clone of the service VM (A). A management manager (B) is a clone of the management manager (A).

The management manager 3 collects statuses of the hardware 6, such as a central processing unit (CPU), a main memory, and a disk device, via a hardware management unit 7.

In each service VM 2, a reference service unit 23 operates. The reference service unit 23 simulates a response from the service daemon 5. The management manager 3 communicates with the reference service unit 23 in place of the service daemon 5 and thus is able to check whether a communication path from the management manager 3 to the service VM 2 is operating normally.

The management manager 3 performs heartbeat communication with another management manager 3, and thus these management managers 3 mutually check statuses. The management manager 3 acquires monitoring information from the other management manager 3. Furthermore, the management manager 3 periodically notifies an administrator 8 of a monitoring status.

As just described, the management system 1 uses the original service VM 2 and the service VM 2 of the clone in combination to include two monitoring mechanisms using the same paths, and the two monitoring mechanisms each communicate with the service daemon 5 and the hardware management unit 7 and notify the administrator 8 of a monitoring status. Then, the management system 1 monitors statuses of the service VMs 2, the management managers 3, and the service daemon 5 based on communication statuses between the original service VM 2, the service VM 2 of the clone, the service daemon 5, the hardware management unit 7, and the administrator 8.

Figure 2:
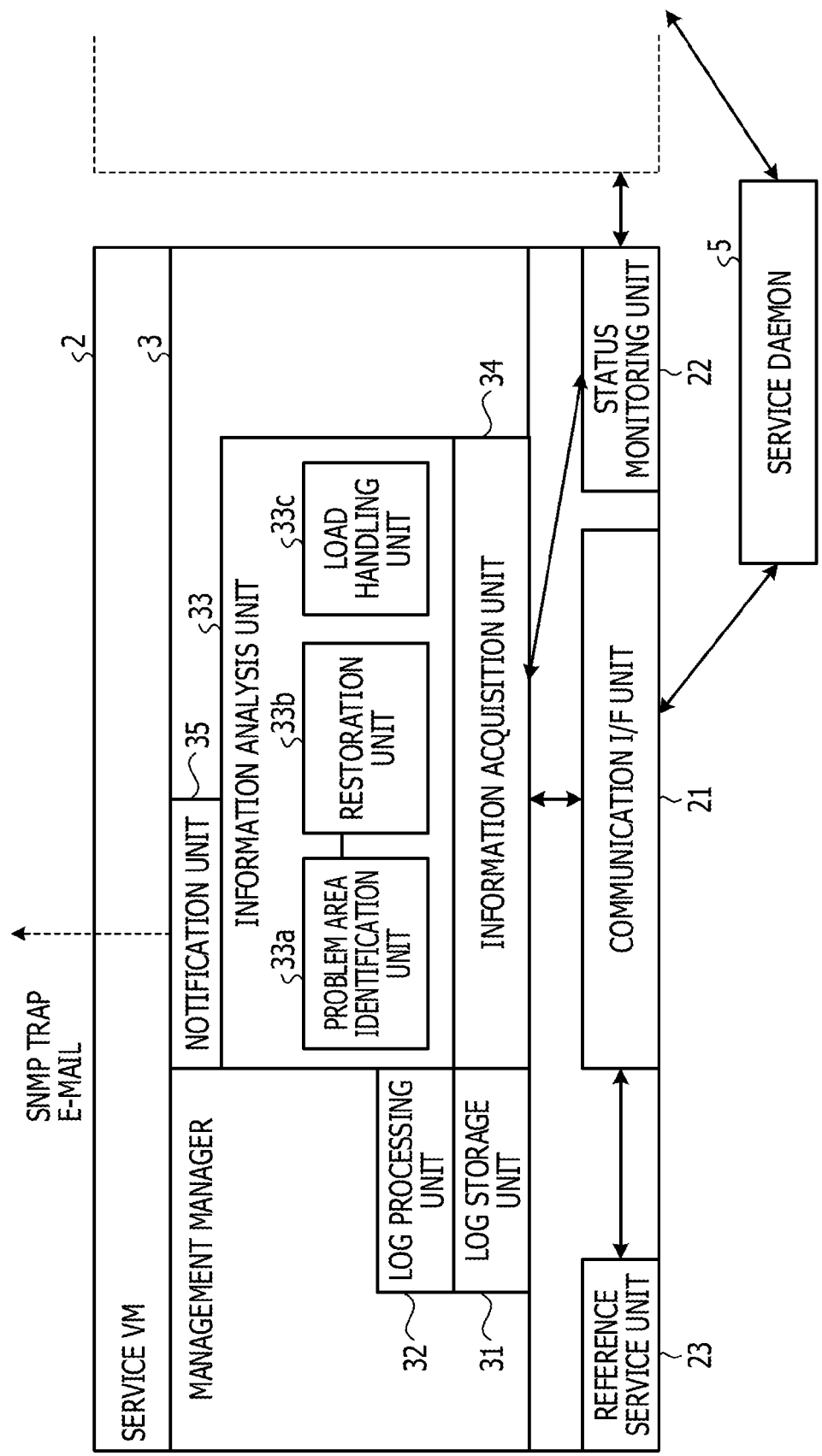
FIG. 2 illustrates a functional configuration of a management manager.

Next, a functional configuration of the management manager 3 will be described. FIG. 2 illustrates a functional configuration of the management manager 3. As illustrated in FIG. 2, the management manager 3 includes a log storage unit 31, a log processing unit 32, an information analysis unit 33, an information acquisition unit 34, and a notification unit 35.

The log storage unit 31 stores, as logs, status information acquired from the service daemon 5 and hardware information acquired from the hardware management unit 7.

The log processing unit 32 processes a log stored by the log storage unit 31 and identifies a status for an item used for identifying a problem area. As items used for identifying a problem area, there are service daemon communication, management manager communication, service VM communication, status information, notification service, and hardware information.

The service daemon communication refers to communication with the service daemon 5. As statuses, there are "connection possible" representing that communication with the service daemon 5 is possible, and "connection impossible" representing that communication with the service daemon 5 is impossible.

The management manager communication refers to communication with the other management manager 3. As statuses, there are "connection possible" representing that communication with the other management manager 3 is possible, and "connection impossible" representing that communication with the other management manager 3 is impossible.

The service VM communication refers to communication with the service VM 2. As statuses, there are "response" representing that communication with the service VM 2 is possible, and "no response" representing that communication with the service VM 2 is impossible.

The status information refers to information acquired from the service daemon 5. As statuses, there are "latest information" representing that latest information has been obtained, and "no latest information" representing that no latest information has been obtained.

The notification service refers to service that provides a notification to the administrator 8. As statuses, there are "notification" representing that a notification has been provided to the administrator 8, and "no notification" representing that no notification has been provided to the administrator 8.

The hardware information refers to information acquired from the hardware management unit 7. As statuses, there are "problem" representing that there is a problem with the hardware 6, and "no problem" representing that there is no problem with the hardware 6.

The information analysis unit 33 identifies a problem area based on item statuses identified by the log processing unit 32, and performs a restoration operation corresponding to an identified problem. The information analysis unit 33 includes a problem area identification unit 33a, a restoration unit 33b, and a load handling unit 33c.

The problem area identification unit 33a identifies a problem area based on the item statuses identified by the log processing unit 32 and clone monitoring information received from the management manager 3 of the clone. Here, clone monitoring information is information of item statuses identified by the management manager 3 of the clone.

FIGS. 3A to 3C each illustrate how to identify a problem area. FIG. 3A illustrates how to determine that there is a problem with the service daemon 5. FIG. 3B illustrates how to determine that there is a problem with a service VM 2. FIG. 3C illustrates how to determine that there is a problem with a management manager 3.

In FIGS. 3A to 3C, a monitoring management system A indicates identified results of statuses for the items provided by the management manager (A), and a monitoring management system B indicates identified results of statuses for the items provided by the management manager (B). Determination indicates statuses identified for the items. When an identified result of a status in either the monitoring management system A or the monitoring management system B is abnormal (x), the determination is abnormal (x). When identified results of statuses in both the monitoring management system A and the monitoring management system B are normal (○), the determination is normal (○).

In FIG. 3A, statuses of the service daemon communication are "connection impossible" (x), statuses of the management manager communication are "connection possible" (○), statuses of the service VM communication are "response" (○), statuses of the status information are "no latest information" (x), and statuses of the notification service are "notification" (○). Statuses of the hardware information are "no problem" (○). That is, no latest information is obtained, communication with the service daemon 5 is impossible, communication between the management managers 3 is possible, and thus a problem with the service daemon 5 is identified.

In FIG. 3B, statuses of the service daemon communication are "connection possible" (○), a status of the management manager communication in the monitoring management system A is "connection possible" (○), and a status of the management manager communication in the monitoring management system B is "connection impossible" (x). A status of the service VM communication in the monitoring management system A is "response" (○), a status of the service VM communication in the monitoring management system B is "no response" (x), and statuses of the status information are "latest information" (○). Statuses of the notification service are "notification" (○), and statuses of the hardware information are "no problem" (○). That is, the service VM communication and the management manager communication are possible in the monitoring management system A, the service VM communication and the management manager communication are impossible in the monitoring management system B, and thus a problem with the service VM (B) is identified.

In FIG. 3C, statuses of the service daemon communication are "connection possible" (○), statuses of the management manager communication are "connection impossible" (x), and statuses of the service VM communication are "response" (○). A status of the status information in the monitoring management system A is "no latest information" (x), a status of the status information in the monitoring management system B is "latest information" (○), a status of the notification service in the monitoring management system A is "no notification" (x), and a status of the notification service in the monitoring management system B is "notification" (○). Statuses of the hardware information are "no problem" (○). That is, in the monitoring management system A, no latest information is obtained, no notification is provided to the administrator 8, there is a problem with the management manager communication, and thus a problem with the management manager (A) is identified.

The restoration unit 33b performs a restoration operation corresponding to a problem area identified by the problem area identification unit 33a. FIG. 4 illustrates restoration operations. FIG. 4 illustrates restoration operations corresponding to combinations (status patterns) of the cases (x) where there are respective problems with the service VM (A), the service VM (B), and the service daemon 5, and the cases (○) where there are no respective problems with the service VM (A), the service VM (B), and the service daemon 5.

A restoration operation for the case where there is a problem with the management manager (A) is the same as that for the case where there is a problem with the service VM (A). A restoration operation for the case where there is a problem with the management manager (B) is the same as that for the case where there is a problem with the service VM (B).

As illustrated in FIG. 4, when there is no problem with the service VM (A), nor with the service VM (B), nor with the service daemon 5, the restoration unit 33b does nothing. When there is a problem with only the service daemon 5, the restoration unit 33b restarts the service daemon 5. The restoration unit 33b restarts the service VM (B) when there is a problem with only the service VM (B), and restarts the service VM (A) when there is a problem with only the service VM (A).

When there are problems with the service daemon 5 and the service VM (B), the restoration unit 33b restarts the service daemon 5 and the service VM (B). When there are problems with the service daemon 5 and the service VM (A), the restoration unit 33b restarts the service daemon 5 and the service VM (A).

When there are problems with both the service VM (A) and the service VM (B) and when there is no problem with the service daemon 5, the service VM (A) and the service VM (B) are restarted not by the restoration unit 33b but externally, for example, externally by providing a notification to the administrator 8. When there are problems with all the service VM (A), the service VM (B), and the service daemon 5, the service VM (A), the service VM (B), and the service daemon 5 are restarted externally, for example, externally by providing a notification to the administrator 8.

The load handling unit 33c takes actions according to variations in load on the virtual environment. Since the service VM 2 operates on the virtual infrastructure 4, it is not desirable to exert an influence on a task VM that operates on the virtual infrastructure 4. For this reason, when a load on the virtual environment is high, the load handling unit 33c performs control to reduce a load on the service VM 2 of the clone.

Figure 5:
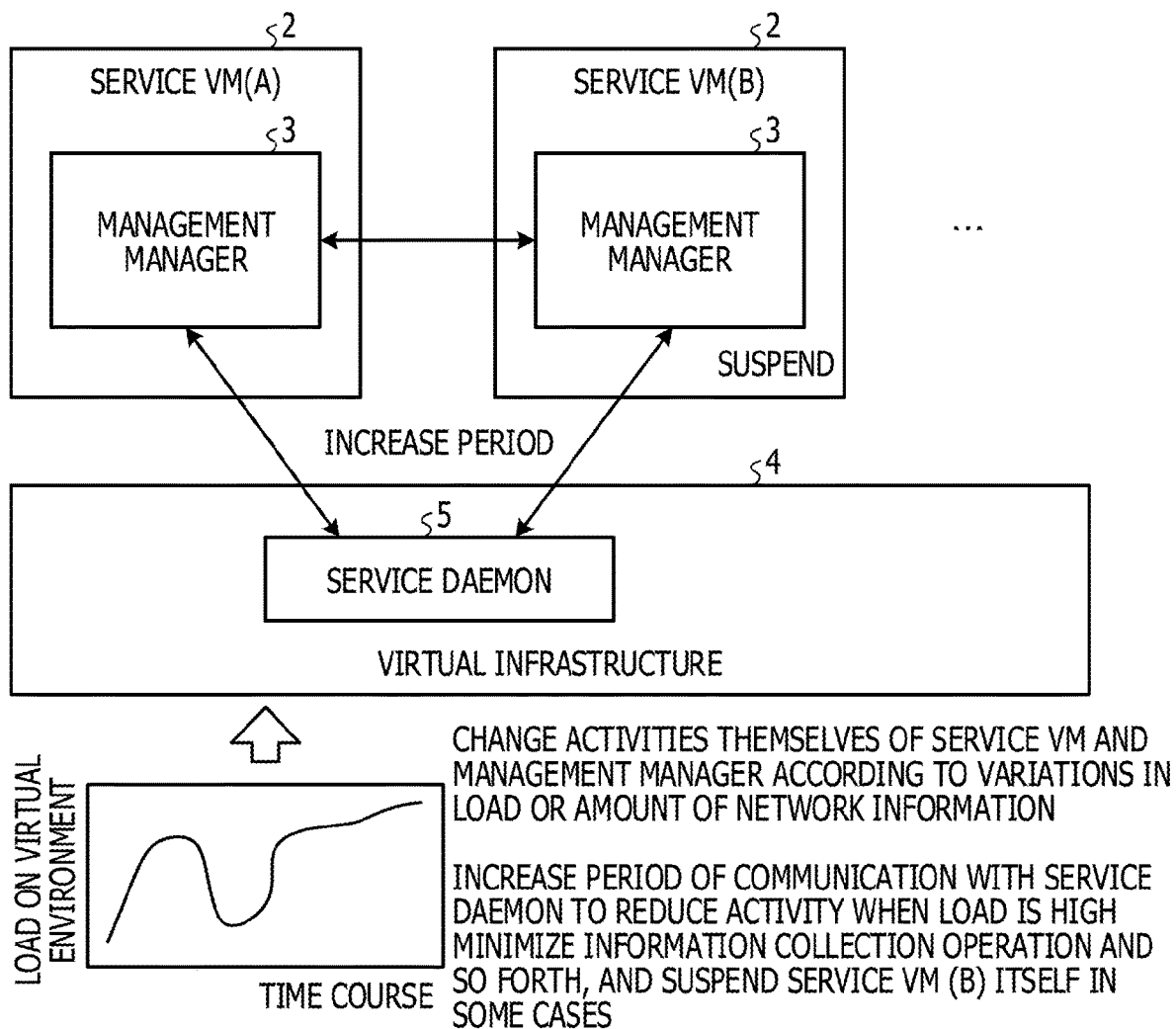
FIG. 5 illustrates actions taken according to variations in load on a virtual environment.

FIG. 5 illustrates actions taken according to variations in load on the virtual environment. When a load on the virtual environment is higher than a predetermined first threshold value, the load handling unit 33c increases a period of communication with the service daemon 5, for example. Alternatively, when a load on the virtual environment is higher than a larger second threshold value, the load handling unit 33c suspends the operation of the clone for a certain period of time.

The information acquisition unit 34 acquires status information from the service daemon 5 via a communication interface (I/F) unit 21 of the service VM 2. The communication I/F unit 21 is an interface that communicates with the service daemon 5. The information acquisition unit 34 also communicates with the reference service unit 23 via the communication I/F unit 21.

Furthermore, the information acquisition unit 34 acquires information about statuses for the items used for identifying a problem area from the other management manager 3 via a status monitoring unit 22 of the service VM 2. The status monitoring unit 22 and a status monitoring unit 22 of the other service VM 2 mutually monitor statuses and also mutually exchange monitoring information.

The notification unit 35 provides a notification to the administrator 8 based on information about statuses of the hardware 6 and the virtual environment acquired from the service daemon 5. A notification is provided to the administrator 8 via simple network management protocol (SNMP) trap or e-mail.

Next, a flow of a process performed by the management manager 3 will be described. FIG. 6 is a flowchart illustrating a flow of a process performed by the management manager 3. As illustrated in FIG. 6, the management manager 3 communicates with the service daemon 5, the management manager 3 of the clone, the service VM 2, and the hardware management unit 7 with a certain period (step S1).

The management manager 3 communicates with the service daemon 5 to acquire information about statuses of the hardware 6 and the virtual environment. The management manager 3 communicates with the management manager 3 of the clone to check whether connection with the management manager 3 of the clone is possible. The management manager 3 communicates with the service VM 2 to check whether communication with the service VM 2 is possible. The management manager 3 communicates with the hardware management unit 7 to acquire information of the hardware 6. Periods with which the management manager 3 communicates with the service daemon 5, the management manager 3 of the clone, the service VM 2, and the hardware management unit 7 may be different from one another.

Then, the management manager 3 identifies statuses for items used for identifying a problem area based on acquired information, an information acquisition status, and a communication status (step S2). Here, as items used for identifying a problem area, there are service daemon communication, management manager communication, service VM communication, status information, notification service, and hardware information.

Then, the management manager 3 acquires statuses for the items used for identifying a problem area from the management manager 3 of the clone (step S3). The management manager 3 of the clone identifies statuses for the items used for identifying a problem area and transmits the identified item statuses.

Then, the management manager 3 identifies a problem area based on the identified item statuses and the item statuses acquired from the management manager 3 of the clone (step S4). Subsequently, the management manager 3 identifies a restoration operation corresponding to the problem area (step S5), and performs the identified restoration operation (step S6).

As described above, in the embodiment, the information acquisition unit 34 performs communication to acquire status information from the service daemon 5 and also performs mutual communication with the service VM 2 and the clone. Then, the log processing unit 32 identifies statuses for the items used for identifying a problem area based on a status of communication with the service daemon 5, a status of communication with the service VM 2, and a status of mutual communication with the clone. Then, the information acquisition unit 34 acquires, from the clone, statuses identified by the clone for the items used for identifying a problem area. Then, the problem area identification unit 33a identifies, based on the statuses identified by the log processing unit 32 and the statuses acquired by the information acquisition unit 34 from the clone for the items used for identifying a problem area, which of the service daemon 5, the service VMs 2, and the management managers 3 a problem area is. Then, the restoration unit 33b performs a restoration operation corresponding to the problem area identified by the problem area identification unit 33a. Thus, the management manager 3 is able to restore the management mechanism in the virtual environment in a short time.

Furthermore, in the embodiment, the load handling unit 33c changes a period of communication with the service daemon 5 or suspends the clone based on a status of a load on the virtual infrastructure 4, and thus the management manager 3 is able to reduce negative influence on the task VM that operates on the virtual infrastructure 4.

Furthermore, in the embodiment, the reference service unit 23 simulates a response from the service daemon 5, and thus the management manager 3 is able to identify whether there is a problem with communication with the service daemon 5 or a problem with communication within the service VM 2.

In the above-described embodiment, the management manager 3 uses, as items used for identifying a problem area, service daemon communication, management manager communication, service VM communication, status information, notification service, and hardware information. However, the management manager 3 may identify a problem area by using a smaller amount of information.

FIGS. 7A to 7C each illustrate how to identify a problem area using statuses of the management manager 3, the service VM 2, and the service daemon 5. FIGS. 7A to 7C each illustrate statuses in the monitoring management system A and the monitoring management system B for the management manager 3, the service VM 2, and the service daemon 5. A status is "OK" representing normality or "NG" representing abnormality.

The management manager 3 extracts a log message of a periodic communication with the management manager 3 of the clone and identifies, based on the extracted log message, whether a status of the management manager 3 is normal or abnormal. The management manager 3 also extracts a log message of a periodic communication to the service VM 2 and identifies, based on the extracted log message, whether a status of the service VM 2 is normal or abnormal. The management manager 3 also extracts a log message of a periodic communication to the service daemon 5 and identifies, based on the extracted log message, whether a status of the service daemon 5 is normal or abnormal.

Then, the management manager 3 acquires, from the management manager 3 of the clone, statuses of the management manager 3, the service VM 2, and the service daemon 5 that have been identified by the management manager 3 of the clone.

Then, the management manager 3 identifies a problem area based on the statuses identified by itself and the statuses identified by the clone for the management manager 3, the service VM 2, and the service daemon 5. For example, in FIG. 7A, a problem with the service daemon 5 has been identified in both of the systems, and thus the management manager 3 identifies the service daemon 5 as a problem area.

In FIG. 7B, there are no problems with communication with the service VM 2 nor with communication with the service daemon 5, there is a problem with communication with the management manager 3 of the clone, and thus the management manager 3 of the clone is identified as a problem area. In FIG. 7C, there are no problems with communication with the service daemon 5, there are problems with communication with the management manager 3 of the clone and with communication between the management manager 3 of the clone and the service VM 2 of the clone, and thus the service VM 2 of the clone is identified as a problem area.

Thus, the management manager 3 identifies a problem area based on the statuses identified by itself and the statuses identified by the clone for the management manager 3, the service VM 2, and the service daemon 5, thereby making it possible to identify a problem area easily.

Figure 8A:
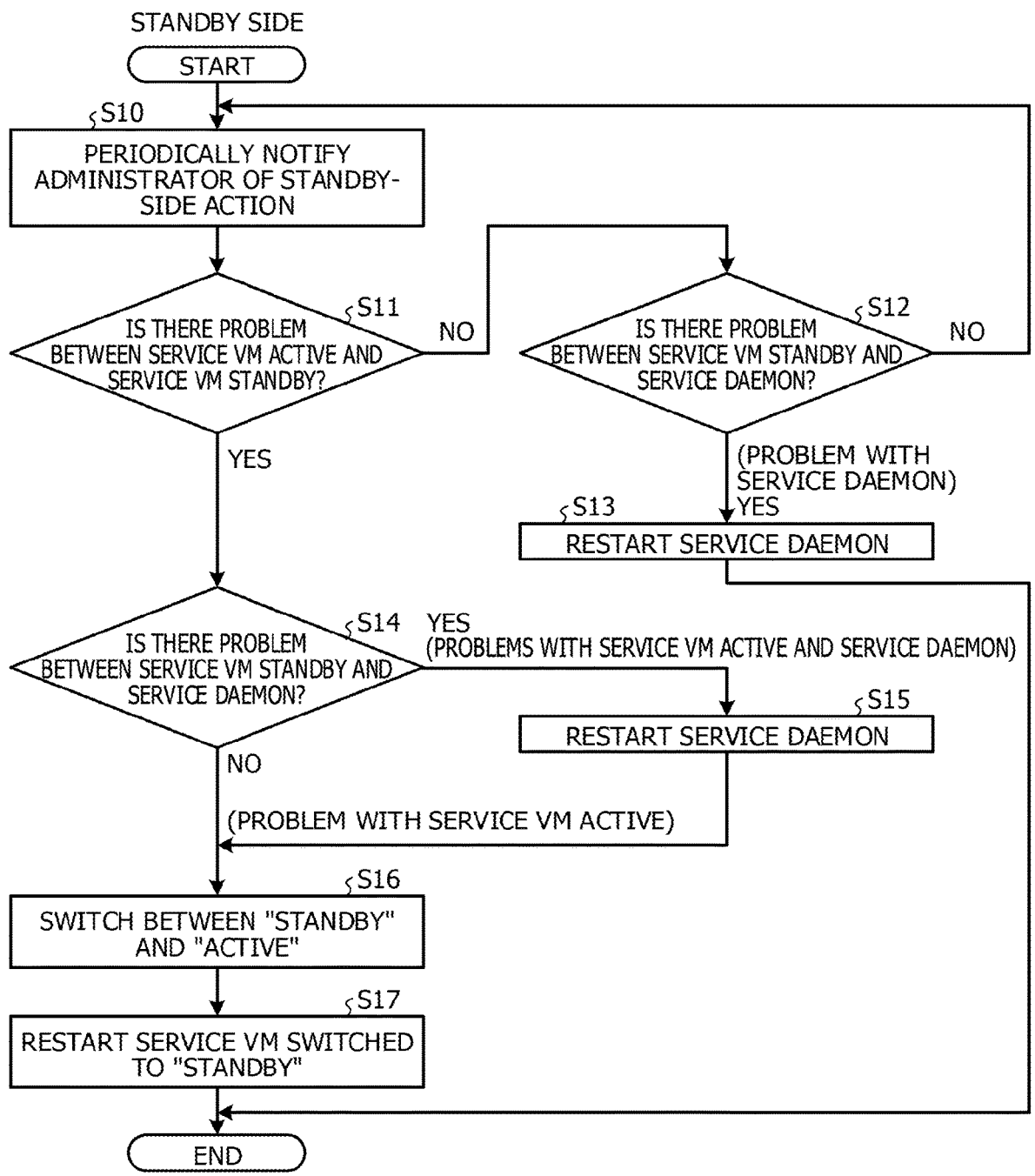
FIGS. 8A and 8B are flowcharts each illustrating a flow of a process of identifying a problem area based on a relationship between a standby-side system and an active-side system.
Figure 8B:
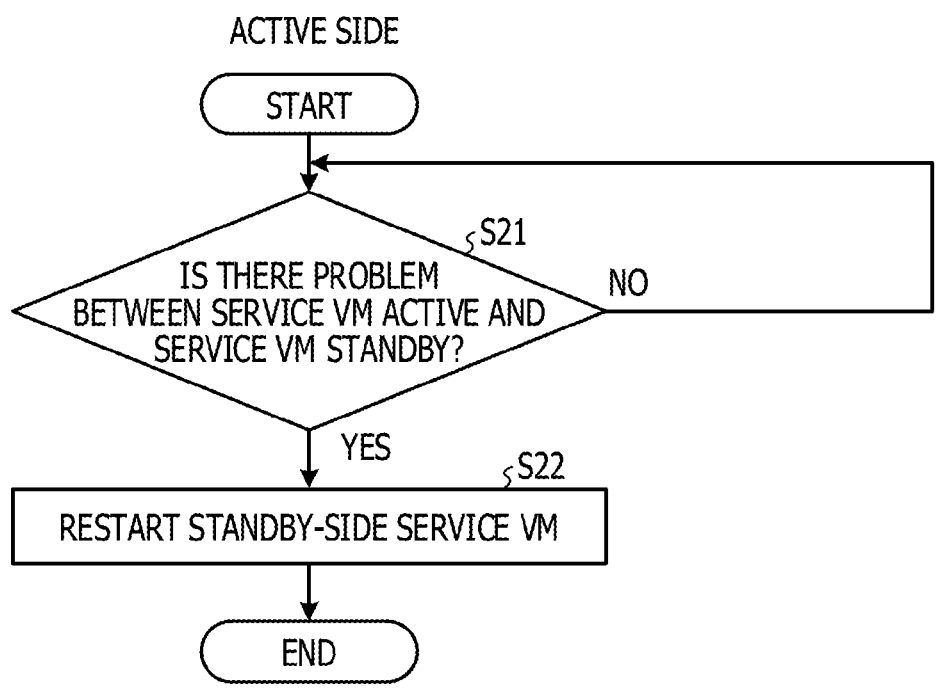

Furthermore, two monitoring management systems may be caused to function as an active monitoring management system in active use and a standby monitoring management system in a standby state to identify a problem area. FIGS. 8A and 8B are flowcharts each illustrating a flow of a process of identifying a problem area based on a relationship between a standby-side system and an active-side system. FIG. 8A illustrates a flow of a standby-side process, and FIG. 8B illustrates a flow of an active-side process.

As illustrated in FIG. 8A, a standby-side management manager 3 periodically notifies the administrator 8 of a standby-side action (step S10). Then, the standby-side management manager 3 determines whether there is a problem between a service VM active and a service VM standby (step S11). Here, the service VM active refers to the service VM 2 in active use, and the service VM standby refers to the service VM 2 in a standby state.

Then, when there is no problem between the service VM active and the service VM standby, the standby-side management manager 3 determines whether there is a problem between the service VM standby and the service daemon 5 (step S12). Then, when there is no problem between the service VM standby and the service daemon 5, the standby-side management manager 3 returns to step S10.

On the other hand, when there is a problem between the service VM standby and the service daemon 5, the standby-side management manager 3 determines that there is a problem with the service daemon 5 and restarts the service daemon 5 (step S13).

When there is a problem between the service VM active and the service VM standby, the standby-side management manager 3 determines whether there is a problem between the service VM standby and the service daemon 5 (step S14). Then, when the standby-side management manager 3 determines that there is a problem between the service VM standby and the service daemon 5, the standby-side management manager 3 determines that there are problems with the service VM active and the service daemon 5. Then, the standby-side management manager 3 restarts the service daemon 5 (step S15), switches between "standby" and "active" (step S16), and restarts the service VM 2 switched to "standby" (step S17).

In step S14, when the standby-side management manager 3 determines that there is no problem between the service VM standby and the service daemon 5, the standby-side management manager 3 determines that there is a problem with the service VM active. Then, the standby-side management manager 3 switches between "standby" and "active" (step S16), and restarts the service VM 2 switched to "standby" (step S17).

Furthermore, an active-side management manager 3 determines whether there is a problem between the service VM active and the service VM standby (step S21). When there is no problem, the active-side management manager 3 performs step S21 again. On the other hand, when there is a problem between the service VM active and the service VM standby, the active-side management manager 3 restarts the standby-side service VM 2 (step S22).

Thus, when it is determined whether there are problems between the service VM active and the service VM standby and between the service VM standby and the service daemon 5, the standby-side management manager 3 is able to identify a problem area easily.

In the embodiment, although the management manager 3 has been described, the configuration that the management manager 3 has is implemented by software, thereby making it possible to obtain a management program that has the same functions as the management manager 3 has. Here, a computer that executes the management program will be described.

Figure 9:
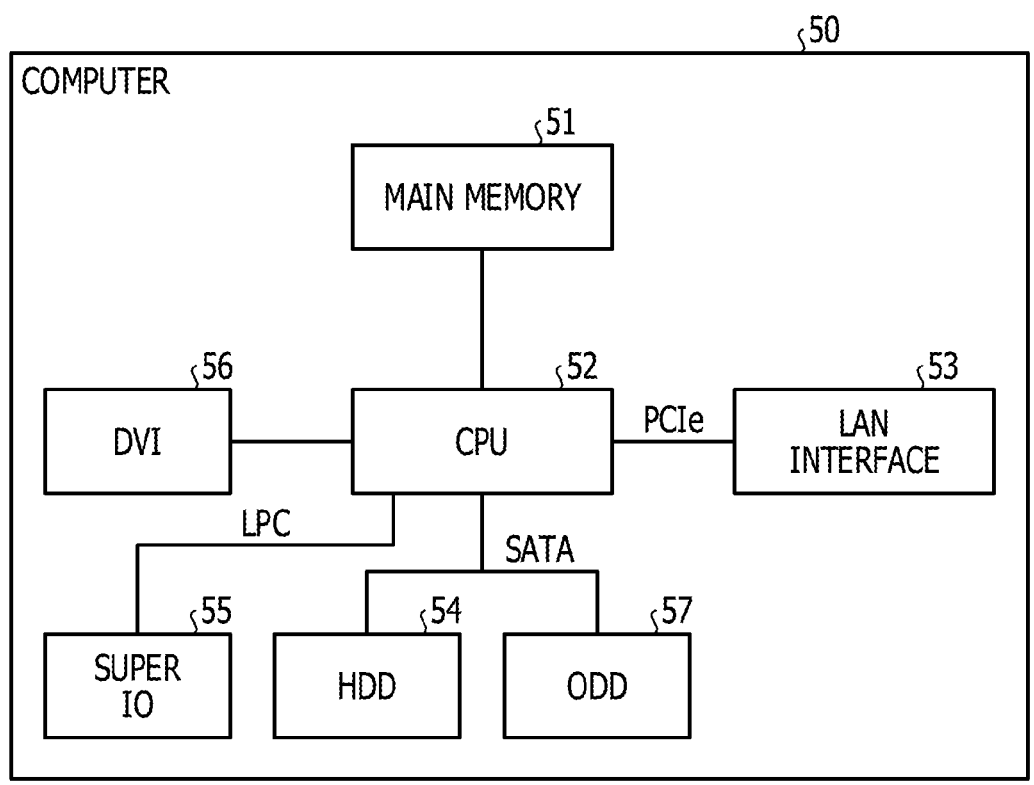
FIG. 9 illustrates a hardware configuration of a computer that executes a management program according to the embodiment.

FIG. 9 illustrates a hardware configuration of a computer that executes a management program according to the embodiment. As illustrated in FIG. 9, a computer 50 includes a main memory 51, a CPU 52, a local area network (LAN) interface 53, and a hard disk drive (HDD) 54. The computer 50 further includes a super input/output (IO) 55, a digital visual interface (DVI) 56, and an optical disk drive (ODD) 57.

The main memory 51 is a memory that stores a program and intermediate execution results of the program, for example. The CPU 52 is a central processing unit that reads a program from the main memory 51 and executes the program. The CPU 52 includes a chip set having a memory controller.

The LAN interface 53 is an interface for coupling the computer 50 to another computer via a LAN. The HDD 54 is a storage device that stores a program and data, and the super IO 55 is an interface to which input devices, such as a mouse and a keyboard, are coupled. The DVI 56 is an interface to which a liquid crystal display is coupled, and the ODD 57 is a device that reads from or writes to a digital versatile disk (DVD).

The LAN interface 53 is coupled to the CPU 52 by using peripheral component interconnect (PCI) Express (PCIe). The HDD 54 and the ODD 57 are coupled to the CPU 52 by using serial advanced technology attachment (SATA). The super IO 55 is coupled to the CPU 52 by using low pin count (LPC).

Then, the management program executed in the computer 50 is stored in a computer-readable recording medium, such as a DVD, is read from the recording medium by the ODD 57, and is installed on the computer 50. Alternatively, the management program is stored in a database or the like in another computer system coupled to the computer 50 via the LAN interface 53, is read from the database or the like, and is installed on the computer 50. Then, the installed management program is stored in the HDD 54, is read into the main memory 51, and is executed by the CPU 52.

Furthermore, in the embodiment, although the case has been described where one clone is used, the embodiment is not limited to this. The embodiment may similarly be applied to the case where two or more clones are used.

Furthermore, in the embodiment, although the case has been described where a problem area in a virtual environment is identified, the embodiment is not limited to this. The embodiment may similarly be applied to the case where a problem area in a real environment is identified without using virtualization technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A management apparatus comprising:
   a memory; and
   a processor coupled to the memory and configured to:
   acquire status information of a virtual infrastructure on which a first management service operates, the virtual infrastructure executed on the management apparatus;
   perform mutual communication with a second management service that has a function identical to a function of the first management service and that operates on the virtual infrastructure;
   identify a status for an item used for identifying a problem area based on a communication status between the virtual infrastructure and the first management service, the status information of the virtual infrastructure, and a communication status with the second management service;
   acquire, from the second management service, a status identified for the item based on the status information of the virtual infrastructure and a communication status of the mutual communication;
   identify the problem area by determining, for each of the virtual infrastructure, the first management service, and the second management service, whether the problem area exists based on the identified status and the acquired status for the item; and
   perform a restoration operation corresponding to the identified problem area,
   the first management service includes executing, by communicating with a service daemon which operates on the virtual infrastructure, a first service processing which simulates a response of the service daemon, and
   the identify the problem area includes determining, by monitoring the first service processing, an abnormality in a communication path from the service daemon.

2. The management apparatus according to claim 1, wherein, according to a status of a load on the virtual infrastructure, a period with which status information of the virtual infrastructure is acquired is changed, or the second management service is suspended.

3. The management apparatus according to claim 1, wherein a status for the item is identified based on results obtained by the first management service and the second management service mutually simulating collections of status information of the virtual infrastructure.

4. A management method executed by a management apparatus including a memory and a processor coupled to the memory, comprising:
   acquiring status information of a virtual infrastructure on which a first management service operates, the virtual infrastructure executed on the management apparatus;
   performing mutual communication with a second management service that has a function identical to a function of the first management service and that operates on the virtual infrastructure;
   identifying a status for an item used for identifying a problem area based on a communication status between the virtual infrastructure and the first management service, the status information of the virtual infrastructure, and a communication status with the second management service;
   acquiring, from the second management service, a status identified for the item based on status information of the virtual infrastructure and a communication status of the mutual communication;
   identifying the problem area by determining, for each of the virtual infrastructure, the first management service, and the second management service, whether the problem area exists based on the identified status and the acquired status for the item; and
   performing a restoration operation corresponding to the identified problem area,
   the first management service includes executing, by communicating with a service daemon which operates on the virtual infrastructure, a first service processing which simulates a response of the service daemon, and
   the identifying the problem area includes determining, by monitoring the first service processing, an abnormality in a communication path from the service daemon.

* * * * *